United States Patent [19]

Kuszaj

[11] Patent Number: 5,167,706
[45] Date of Patent: Dec. 1, 1992

[54] SILANE PRIMER COMPOSITION

[75] Inventor: Karl T. Kuszaj, East Brunswick, N.J.

[73] Assignee: American Standard Inc., New York, N.Y.

[21] Appl. No.: 622,064

[22] Filed: Dec. 4, 1990

[51] Int. Cl.$^5$ ............................................... C09D 7/00
[52] U.S. Cl. .................................................. 106/287.11
[58] Field of Search ............ 106/287.11, 287.1, 287.15, 106/287.24

[56] References Cited

U.S. PATENT DOCUMENTS

| | | | |
|---|---|---|---|
| Re. 30,660 | 6/1981 | Laganis | 106/252 |
| 3,580,796 | 5/1971 | Hick et al. | 428/38 |
| 4,179,537 | 12/1979 | Rykowski | 427/387 |
| 4,341,686 | 7/1982 | Chakrabarti et al. | 427/244 |
| 4,664,982 | 5/1987 | Genovese et al. | 428/447 |

FOREIGN PATENT DOCUMENTS 0176062 4/1986 European Pat. Off. .
2146266 4/1985 United Kingdom .

OTHER PUBLICATIONS

Plueddemann, "Silanes, in Bonding Thermoplastic Polymers to Mineral Surfaces", Applied Polymer Symposium, No. 19, 1972, pp. 75-90.
Product Specification Sheet for Dow Corning-®Z-6032 Silane.
Product Specification Sheet for Dow Corning-®Z-6020.
Product Specification Sheet for Dow Corning-®Z-6030.

*Primary Examiner*—Theodore Morris
*Assistant Examiner*—David M. Brunsman
*Attorney, Agent, or Firm*—Blum Kaplan

[57] ABSTRACT

The present invention relates to an improved silane primer composition utilized to form multi-layer sanitaryware such as kitchen and bathroom fixtures. The silane primer composition includes N-2-(vinyl-benzylamino)-ethyl-3-aminopropyltrimethoxysilane monohydrogen chloride dissolved in a suitable carrier. Alternatively, the silane primer composition includes a silane coupling agent dissolved in a diluent-effective concentration of methoxypropanol.

7 Claims, 5 Drawing Sheets

SILANE PRIMER COMPOSITION

BACKGROUND OF THE INVENTION

This invention is directed to a silane primer composition and, in particular, to a silane primer composition for binding a plastic material to glass or steel by a coupling reaction.

Silane primers for use in multi-layer composite molded structures are known in the art. These structures may be used in sanitaryware composite articles such as bathroom and kitchen fixtures, and particularly in bathtubs, sinks, whirlpools, and shower receptors. In U.S. Pat. No. 4,664,982, the disclosure of which is incorporated by reference herein, a multi-layer structure includes a metal substrate with a ceramic enamel layer. A silane primer is used to bind a plastic layer to the enamel layer. The preferred silane primer is specified as vinyl silane, particularly 3[2(vinyl benzylamino) ethylamino] propyltrimethoxy silane.

Another multi-layer composite molded structure is disclosed in U.S. Ser. No. 07/400,289, the disclosure of which is incorporated by reference herein. A silane primer is used to bind a plastic layer to a non-enameled portion of a metal substrate. Again, the preferred silane primer specified is vinyl silane, particularly 3[2(vinyl benzylamino) ethylamino] propyltrimethoxy silane.

Although the silane primer may be incorporated into the plastic layer and then applied to the substrate, the preferred method of application is to spray or otherwise apply the silane primer onto the enameled or non-enameled metal substrate and then apply a plastic foam material using insert-molding techniques. In order to form a bond between the silane and the enameled or nonenameled metal substrate, the silane primer should be dissolved in a diluent so that, after application onto the enameled or nonenameled metal substrate, the silane in the primer hydrolyzes with atmospheric moisture in response to the evaporation of the diluent. The diluent traditionally used for this purpose is isopropanol alcohol.

However, isopropanol alcohol is less than satisfactory as a diluent of the silane primer if the ambient temperature is high or if the ambient humidity is low. In these conditions, the isopropanol alcohol begins drying and the silane begins to hydrolyze as, or even before, the silane primer is applied to the enamel or metal substrate. If the hydrolyzation partially or completely occurs before the silane primer is applied to the enamel or metal substrate, the silane does not satisfactorily chemically bond, if at all, to the enamel or metal substrate, and delamination occurs.

Moreover, the present inventor has found a particular silane coupling agent for use in a silane primer composition which provides unexpectedly superior resistance to chipping, cracking, crazing, deformation and delamination of the multi-layer composite molded structure when the structure is subjected to impact forces of energy.

Accordingly, a silane primer composition which is effective at chemically bonding plastic to an enamelled or nonenamelled metal substrate at high temperatures and low humidity, and a silane primer composition which provides maximum resistance to chipping, cracking, crazing, deformation and delamination of the multi-layer composite molded structure when the structure is subjected to impact forces of energy is desired.

SUMMARY OF THE INVENTION

Generally speaking, in accordance with the instant invention, a silane primer composition utilized to form multi-layer composite molded structures in sanitaryware composite articles such as kitchen and bathroom fixtures is provided The silane primer composition includes N-2-(vinylbenzylamino)-ethyl-3-aminopropyl-trimethoxysilane monohydrogen chloride dissolved in a suitable carrier. Alternatively, the silane primer composition includes a silane coupling agent dissolved in a diluent-effective concentration of methoxypropanol.

Accordingly, it is an object of the present invention to provide an improved silane primer composition.

Another object of the invention is to provide a silane primer composition which may be sprayed or otherwise directly applied onto an enamelled or non-enamelled metal substrate.

A further object of the invention is to provide a silane primer composition which bonds plastic to an enamelled or nonenamelled metal substrate.

Still another object of the invention is to provide a silane primer composition which prevents delamination of plastic from an enamelled or non-enamelled metal substrate even when the silane primer composition is applied at a high temperature.

Yet another object of the invention is to provide a silane primer composition which prevents delamination of plastic from an enamelled or non-enamelled metal substrate even when the silane primer composition is applied in low humidity A further object of the invention is to provide a silane primer composition which provides maximum resistance to chipping, cracking, crazing, deformation and delamination of the multi-layer composite molded structure when the structure is subjected to impact forces of energy.

Still other objects and advantages of the invention will in part be obvious and will in part be apparent from the specification.

The invention accordingly comprises a composition of matter possessing the characteristics, properties, and the relation of constituents which will be exemplified in the composition hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
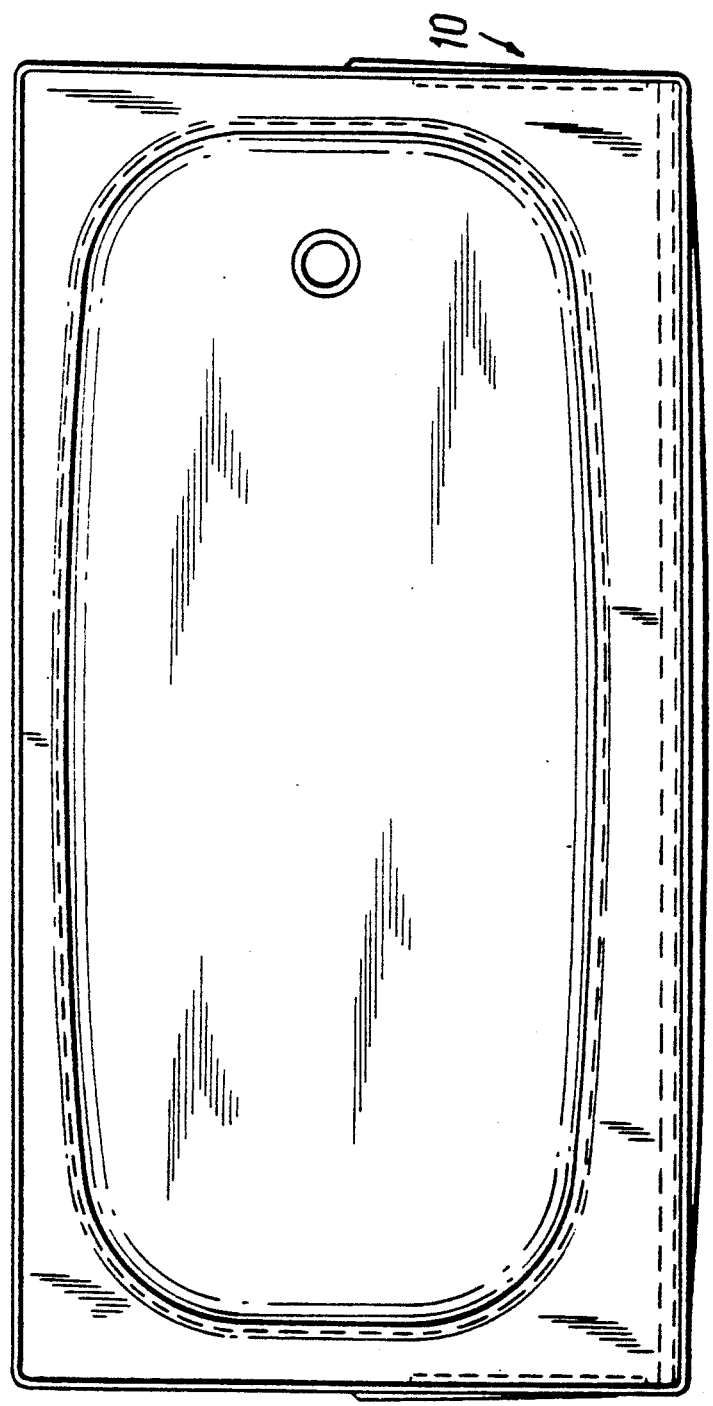
FIG. 1 is a top plan view of an enameled carbon steel bathtub constructed in accordance with the present invention.
Figure 2:
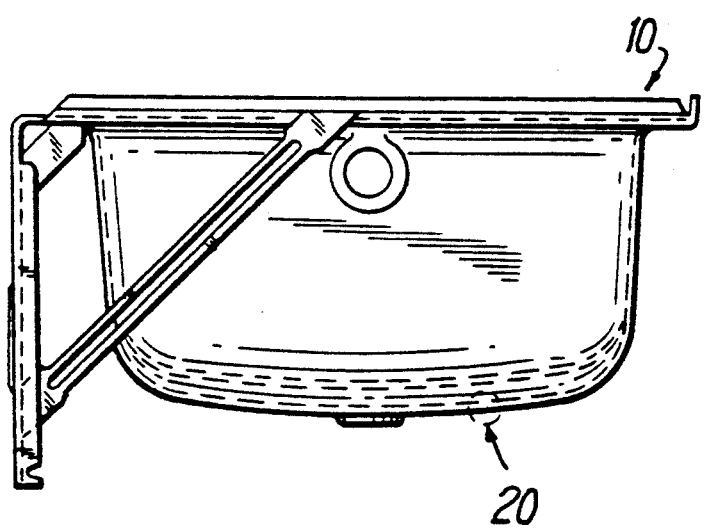
FIG. 2 is an elevational view of one end of the bathtub of FIG. 1.
Figure 3:
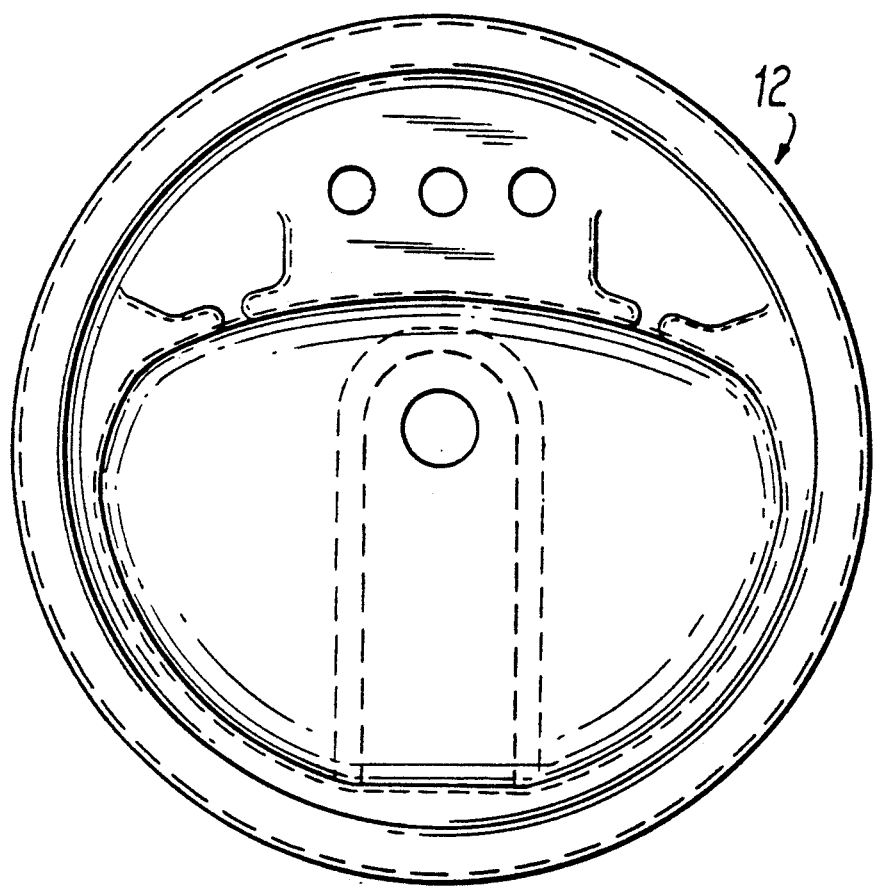
FIG. 3 is a top plan view of an enameled carbon steel bathroom sink constructed in accordance with the present invention.
Figure 4:
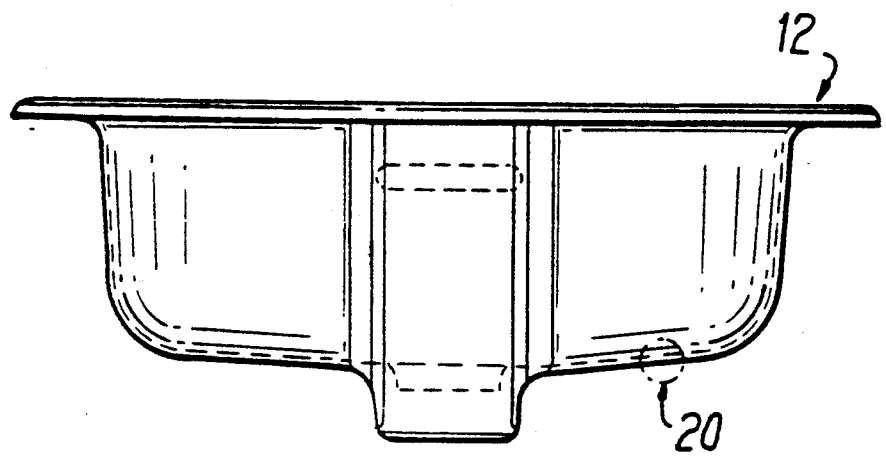
FIG. 4 is an elevational view of the bathroom sink of FIG. 3.
Figure 5:
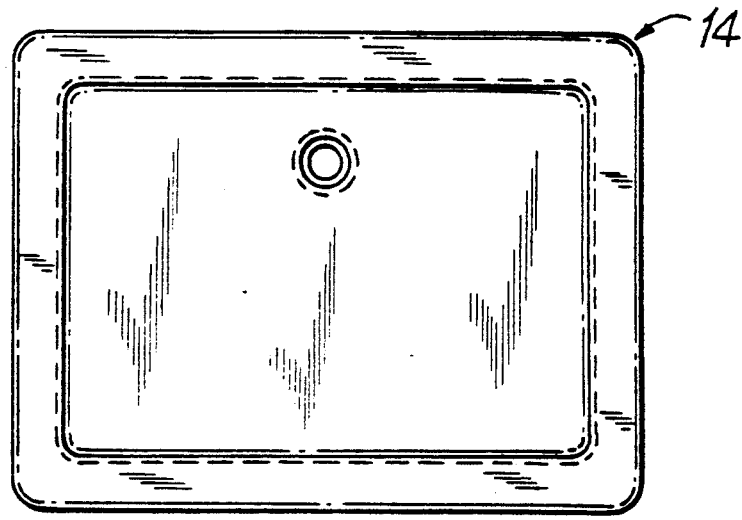
FIG. 5 is a top plan view of an enameled carbon steel shower receptor constructed in accordance with the present invention.
Figure 6:
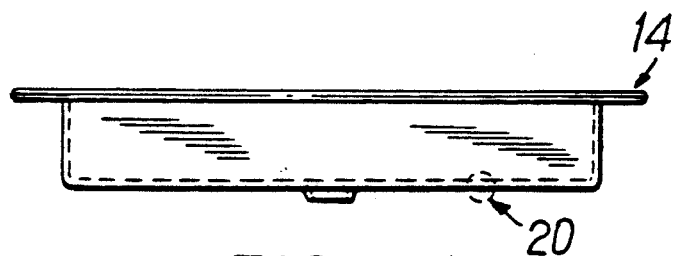
FIG. 6 is an elevational view of the shower receptor of FIG. 5.
Figure 7:
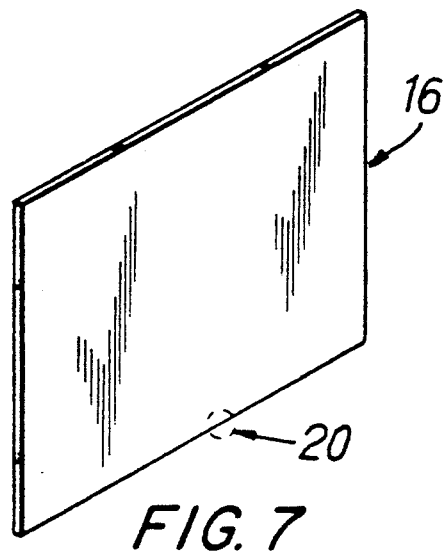
FIG. 7 is an isometric view of an enameled carbon steel panel constructed in accordance with the present invention.

Reference is made to FIGS. 1-7 which depict enameled steel plumbing fixtures and an enameled steel wall panel constructed in accordance with the present invention. Bathtub 10 in FIGS. 1 and 2, bathroom sink 12 in FIGS. 3 and 4, shower receptor 14 in FIGS. 5 and 6, and wall panel 16 in FIG. 7 such as is used for bathtub surrounds or shower stalls are all formed having a composite structure 20. Composite structure 20 may be either the structure shown in FIG. 8 as described in U.S. Pat. No. 4,664,982, or the structure shown in FIG. 9 as described in application Ser. No. 07/400,289.

Figure 8:
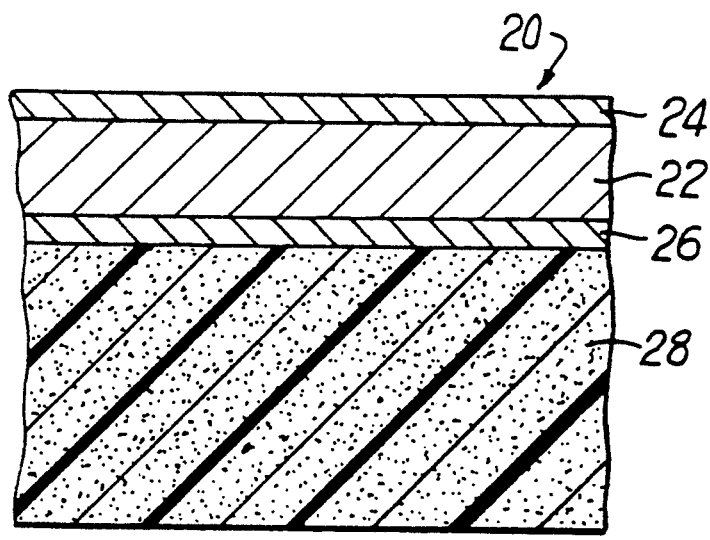
FIG. 8 is a greatly enlarged view taken from within the broken line circles of FIGS. 2, 4, 6 and 7 which illustrates the composite structure of the present invention.
Figure 9:
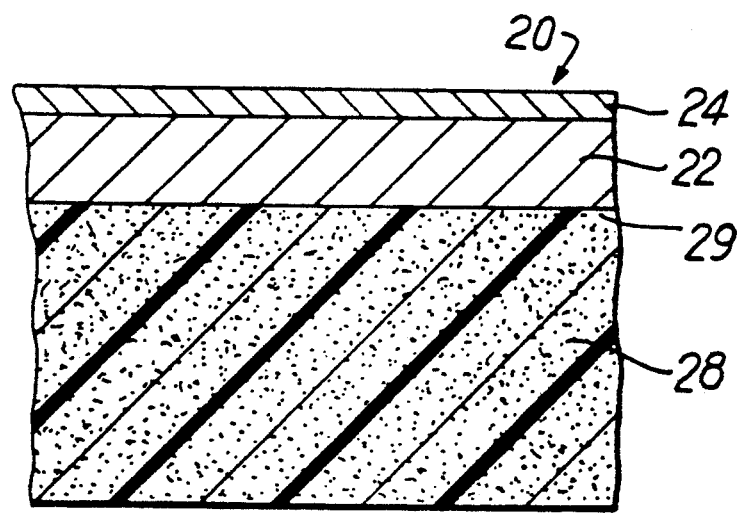
FIG. 9 is a greatly enlarged view taken from within the broken line circles of FIGS. 2, 4, 6 and 7 which illustrates an alternative composite structure of the present invention.

Composite structure 20 as shown in FIG. 8 and described in U.S. Pat. No. 4,664,982 includes a steel substrate 22 to which enamel layers 24 and 26 are bonded on either side thereof. Plastic layer 28 is bonded to enamel layer 26. Composite structure 20 as shown in FIG. 9 and described in application Ser. No. 07/400,289 varies from composite structure 20 shown in FIG. 8 in that there is no enamel layer 26 and plastic layer 28 is bonded directly to steel substrate 22 at steel surface 29.

Enamel 24 and, if desired, enamel 26 is baked onto steel substrate 22 after steel substrate 22 has been stamped into the desired shape of the fixture or article. As generally practiced in the manufacture of enameled-steel plumbing fixtures, enamel layers 24 and 26 have a thickness in the range of about 1/128 to 1/32 of an inch, although other thicknesses may be used. The enamel generally is composed of inorganic oxides with a high concentration of silicon dioxide, forming a glassy layer when fused to steel substrate 22.

Plastic layer 28 is applied to enamel layer 26 or steel surface 29 as a plastic resin. Various resins may be used in practicing the present invention, including, but not limited to, unsaturated polyester containing vinyl monomer, epoxy, polyurethane, isocyanurate, nylon and others. The resin may be either foamed or unfoamed. The resin can be filled to provide reinforcement by any suitable material Such fillers include glass spheres, fibers and weaves, ceramic spheres and fibers, boron, carbon fibers, graphite, wollastonite, and others.

A typical resin mixture is formulated of the following compounds and materials:

TABLE I

| Resin Components | Parts |
|---|---|
| Unsaturated Polyester Resin Containing Vinyl Monomer (Pioneer 236) | 100 |
| Aluminum Trihydrate | 100 |
| ¼ Chopped Fiberglass (OCF 832-FC) | 5 |
| Cumene Hydroperoxide | 0.5 |
| Dimethylethanolamine | 3.5 |
| Polymethylene Polyphenylisocyanate (Upjohn Papi 901) | 10 |
| Silicone Surfactant (Dow Corning 193) | 0.3 |
| Pigment | 0.5 |
| Water | 0.25 |

A resin primer composition is used to bind plastic layer 28 to enamel layer 26 or steel surface 29. A typical procedure is described as follows. A silane primer composition containing a silane coupler dissolved in a carrier is applied to the enameled steel plumbing fixture, such as a bathtub. The silane primer composition is applied either on the ceramic enamel or directly on non-enamelled steel. Preferably, the silane primer composition is sprayed, and in an amount such that at least a monolayer of silane coupler is deposited on the enamel or steel. As the carrier evaporates, the silane coupler hydrolyzes into a silanol with the moisture contained in the surrounding air and thereby bonds to the steel fixture or ceramic enamel layer.

After the carrier has completely evaporated, the fixture is placed into a mold, and a plastic resin is injected into the mold so that the plastic resin comes in contact with the hydrolyzed silane coupler. The resin mixture is introduced into the mold to provide a packing factor (the ratio of the volume of resin mixture to the volume of the mold) of from about 20% to 100%.

The plastic resin is allowed to cure into a laminate, a process requiring approximately at least three minutes for particulate composite structures or about six minutes for a bathtub. The plastic resin bonds with the hydrolyzed silane coupler which in turn is bonded to the enamel or steel. Thus, the plastic is bonded to the steel fixture. The resulting sanitaryware fixture is then removed from the mold.

Although this injection molding technique is preferred, other methods of applying the plastic resin to the silane-coated enamel or steel may be used. Methods for applying the plastic resin thus include spray-up, hand lay-up, RIM, RRIM, or RTM processes.

The silane coupler must be capable of bonding the plastic layer onto the metal substrate or onto the ceramic enamel layer. The silane coupler is preferably present in the silane primer composition in an amount between about 3% and 9% by weight, and the carrier is present in the silane primer composition in an amount between about 91% and 97% by weight. In the particularly preferred embodiment, the silane coupler and carrier are present in an amount of 6.5% and 93.5%, respectively.

The silane primer composition should be free of water and not exposed to the atmosphere before being applied to the enamel or steel. If the silane primer composition is exposed to water or moisture in the air, the silane coupler will hydrolyze prior to application. The effectiveness of the silane primer composition will then be greatly reduced since the silane will not sufficiently bind to the enamel or steel.

In accordance with the invention, the applicant has ascertained that N-2-(vinylbenzylamino)-ethyl-3-aminopropyltrimethoxysilane monohydrogen chloride is unexpectedly superior as a silane coupler.

Three silane compounds including N-2-(vinylbenzylamino)ethyl-3-aminopropyltrimethoxysilane monohydrogen chloride were dissolved in isopropanol alcohol and used to bond polyurethane to enameled steel panels. The resulting multi-layer panels were tested in accordance with Engineering Standard GA202, except that 1"×1" specimens were utilized instead of the 1"×3" specimens described in the standard. The samples were held in an INSTRON ®Universal Testing Instrument, Model No. 1123, manufactured by Instron Corp., Canton, Mass. 02021, and a wedge was driven at the interface of the plastic backing and the enamel surface. Table II shows that the enameled steel samples prepared with the silane primer composition containing N-2-(vinylbenzylamino)-ethyl-3aminopropyltrimethoxy-silane monohydrogen chloride has better bonding over the samples prepared with the other silane primer compositions.

TABLE II

| Silane Coupler | Chemical Name |
|---|---|
| A[1] | N-(β-aminoethyl)-γ-aminopropyltrimethoxysilane |
| B[2] | γ- methacryloxypropyletrimethoxysilane |
| C[3] | N-2-(vinylbenzylamino) ethyl-3-aminopropyl-trimethoxysilane monohydrogen chloride |

2.60% by weight in composition
2.60% by weight in composition
2.60% by weight in composition

| Silane Coupler | Sample | Load to Failure (lbs.) | Penetration of Wedge Extension to Failure (in.) | Remark Code (see below) |
|---|---|---|---|---|
| A | #1 | 73 | 0.03 | 1 |
|   | #2 | 92 | 0.07 | 2 |
|   | #3 | 83 | 0.03 | 1 |
|   | #4 | 73 | 0.07 | 1 |
|   | #5 | 107 | 0.11 | 3 |
|   | #6 | 100 | 0.02 | 2 |
|   | Average | 88 | 0.05 |   |
| B | #1 | 97 | 0.14 | 4 |
|   | #2 | 95 | 0.13 | 4 |
|   | #3 | 88 | 0.12 | 4 |
|   | #4 | 130 | 0.29 | 5 |
|   | #5 | 92 | 0.18 | 6 |
|   | #6 | 93 | 0.26 | 6 |
|   | Average | 99 | 0.19 |   |
| C | #1 | 145 | 0.36 | 7 |
|   | #2 | 159 | 0.45 | 7 |
|   | #3 | 137 | 0.29 | 8 |
|   | #4 | 165 | 0.87 | 7 |
|   | #5 | 142 | 0.54 | 8 |
|   | #6 | 164 | 0.77 | 9 |
|   | Average | 152 | 0.55 |   |

Remark Codes:
1 - Some ground coat pulled away, remainder of substrate delaminated from primer
2 - Substrate delaminated from primer
3 - Most substrate delaminated from primer, little foam stuck
4 - ½ ground coat pulled off, little foam remained stuck
5 - Some ground coat pulled off, ½ foam stuck
6 - Some ground coat pulled off, some foam stuck
7 - Some ground coat pulled off, most foam stuck
8 - ½ foam stuck, ½ ground coat pulled off
9 - Foam still stuck The chemical formula for N-2-(vinylbenzylamino)-ethyl-3aminopropyltrimethoxysilane monohydrogen chloride is as follows:

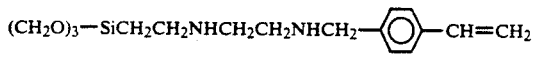

$(CH_2O)_3-SiCH_2CH_2NHCH_2CH_2NHCH_2-\phi-CH=CH_2$

The compound N-2-(vinylbenzylamino)-ethyl-3-aminopropyltrimethoxysilane monohydrogen chloride is marketed by Dow Corning Corporation, Midland, Mich. 48640-0994 under the trade name Z-6032. However, N-2-(vinylbenzylamino)-ethyl-3-aminopropyltrimethoxysilane monohydrogen chloride has not heretofore been used in a silane primer composition for binding a plastic layer onto a metal substrate or onto a ceramic enamel layer on a metal substrate to form a reinforced laminate useful in bathroom and kitchen fixtures.

The applicant has also ascertained that the preferred carrier in the silane primer composition is methoxypropanol if the multi-layer structure is to be constructed in an environment having a high ambient temperature or low ambient humidity. The methoxypropanol is particularly effective when used in a silane primer composition applied to enamel or steel at a temperature between about 55° F. and 90° F. or a humidity between about 35 and 80% RH.

Two silane primer compositions were prepared and applied to enameled steel panels at a temperature of about 80° F. and humidity of about 75% RH. Both silane primer compositions contained N-2 (vinylbenzylamino)-ethyl-3-aminopropyltrimethoxysilane monohydrogen chloride as the silane coupler. However, the first silane coupler was dissolved in isopropanol alcohol whereas the second silane coupler was dissolved in an equal amount of methoxypropanol. The silane primer composition containing isopropanol alcohol dried as the composition was sprayed onto the enamel steel panel, thereby hydrolyzing the silane before bonding could occur. In contrast, the silane primer composition containing methoxypropanol remained liquid upon application to the enamel steel panel, allowing the silane to hydrolyze and form a bond with the enamel steel panel.

After a polyurethane resin was applied and allowed to cure, the resulting panels were compared. The panel utilizing the silane primer composition containing isopropanol alcohol was severely delaminated. However, the panel utilizing the silane primer composition containing methoxypropanol remained laminated.

A silane primer composition utilizing methoxypropanol may also be used at lower temperatures and higher humidities. If so, the time before the plastic resin is applied should be increased to allow complete evaporation of the methoxypropanol and complete hydrolyzation of the silane.

To summarize the benefits of the multi-layer sanitaryware prepared using silane primer compositions made in accordance with the invention, the structures experience less chipping, cracking, crazing, deformation and delamination if made using a silane primer composition containing N-2-(vinyl-benzyl-amino)-ethyl-3-aminopropyltrimethoxysilane monohydrogen chloride dissolved in a suitable carrier. Additionally, structures formed in high temperatures or low humidity experience less delamination if made using a silane primer composition containing a silane coupling agent dissolved in methoxypropanol.

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween Particularly it is to be understood that in said claims, ingredients or compounds recited in the singular are intended to include compatible mixtures of such ingredients wherever the sense permits.

What is claimed is:

1. A silane primer composition for use in bonding a plastic layer onto a metal sanitaryware or onto a ceramic enamel layer on a metal sanitaryware to form a reinforced laminate, comprising:

N-2-(vinylbenzylamino)-ethyl-3-aminopropyltrimethoxysilane monohydrogen chloride in an amount sufficient to bond the plastic layer onto the metal sanitaryware or onto the ceramic enamel layer on the sanitaryware; and methoxypropanol as a carrier which is capable of evaporating and which is present in an amount sufficient to dissolve the N-2-(vinylbenzylamino)-ethyl-3-aminopropyltrimethoxysilane monohydrogen chloride.

2. The silane primer composition of claim 1, wherein the N-2-(vinylbenzylamino)-ethyl-3-aminopropyltrimethoxysilane monohydrogen chloride is present in an amount between about 3% and 9% percent by weight.

3. The silane primer composition of claim 1, wherein the methoxypropanol is present in an amount between about 91% and 97% by weight.

4. The silane primer composition of claim 1, wherein the N-2-(vinylbenzylamino)-ethyl-3-aminopropyltrimethoxysilane monohydrogen chloride is capable of bonding an unsaturated polyester containing vinyl monomer, epoxy, polyurethane, isocyanurate, or nylon onto the metal sanitaryware or onto the ceramic enamel layer on the metal sanitaryware.

5. The silane primer composition of claim 1, wherein the N-2-(vinylbenzylamino)-ethyl-3-aminopropyltrimethoxysilane monohydrogen chloride is capable of bonding the plastic layer onto a steel sanitaryware or onto an enameled steel sanitaryware.

6. The silane primer composition of claim 1, wherein the N-2-(vinylbenzylamino)-ethyl-3-aminopropyltrimethoxysilane monohydrogen chloride is capable of bonding the plastic onto the metal sanitaryware or onto the ceramic enamel layer on the metal sanitaryware to form a reinforced laminate having a thickness of at least $\frac{1}{8}$ inch and having a density between about 20 lbs./ft.$^3$ to about 125 lbs./ft.$^3$ whereby the laminate is resistant to delamination when subjected to a sudden temperature change of at least about 180° F.

7. The silane primer composition of claim 1, wherein the silane coupler is present in an amount of about 6.5% by weight and the methoxypropanol is present in an amount of about 93.5% by weight.

* * * * *